Figure 1:
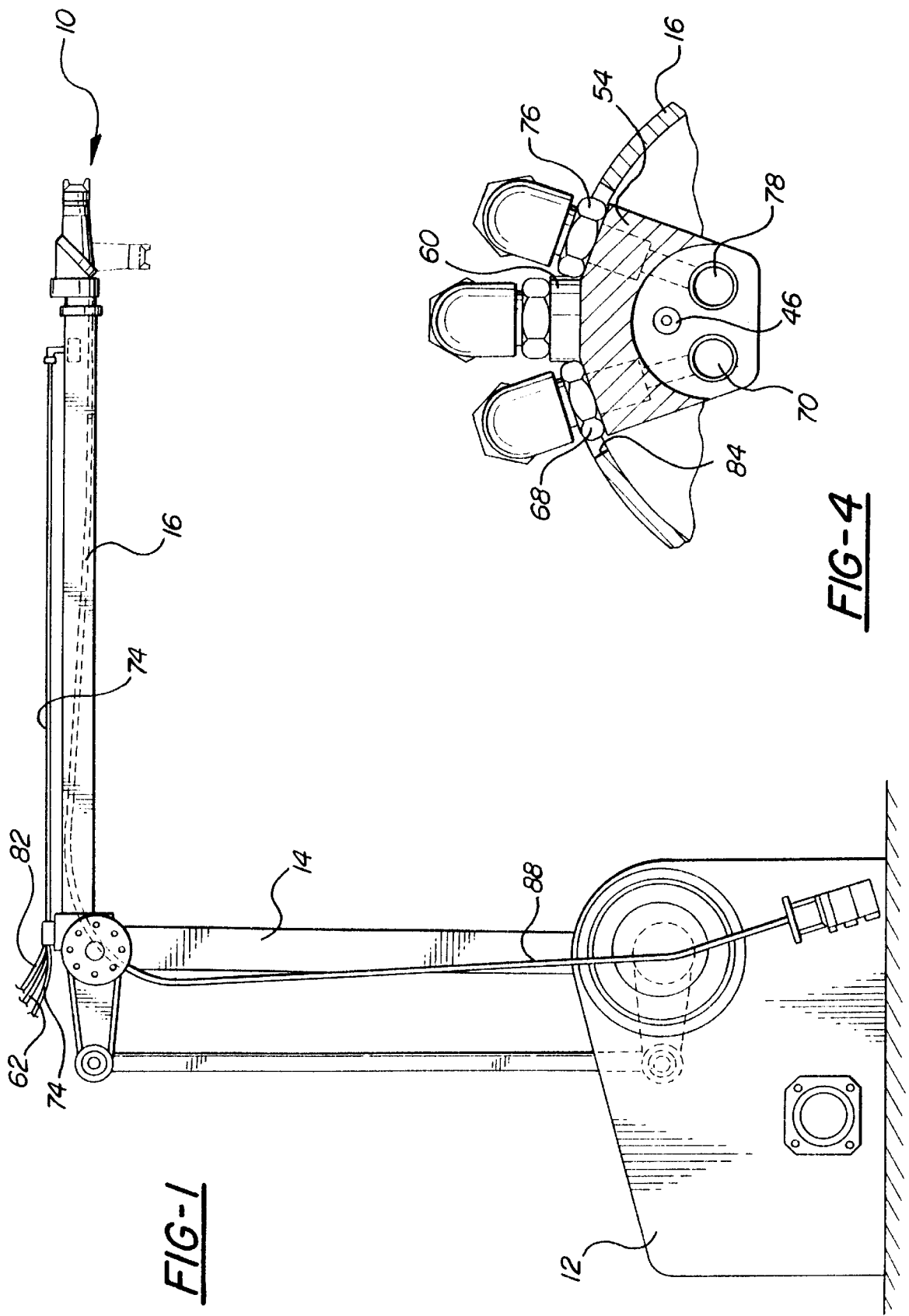

United States Patent [19]
McClosky

[11] Patent Number: 5,887,800
[45] Date of Patent: Mar. 30, 1999

[54] ROBOT WRIST AND SPRAY APPLICATOR

[75] Inventor: Stan H. McClosky, Rochester Hills, Mich.

[73] Assignee: Fanuc Robotics North America, Inc., Rochester Hills, Mich.

[21] Appl. No.: 922,541

[22] Filed: Sep. 3, 1997

[51] Int. Cl.[6] ...................................................... B05B 13/04
[52] U.S. Cl. ..................... 239/587.1; 239/587.5; 901/43
[58] Field of Search ................................. 239/532, 587.1, 239/587.2, 587.5, 753, 227, 263.1, 263.3, 264; 901/43

[56] References Cited

U.S. PATENT DOCUMENTS

| | | |
|---|---|---|
| 4,353,677 | 10/1982 | Susnjara et al. ......................... 414/735 |
| 4,402,234 | 9/1983 | Malarz et al. . |
| 4,613,082 | 9/1986 | Gimple et al. . |
| 4,690,012 | 9/1987 | Dahlquist et al. . |

*Primary Examiner*—Andres Kashnikow
*Assistant Examiner*—Dinh Q. Nguyen
*Attorney, Agent, or Firm*—Howard & Howard

[57] ABSTRACT

A robot wrist and spray head applicator assembly (10) comprising a base (18) presenting an arm axis (A) and supported on a robot arm (16). A housing (22) is supported by the base (18) for rotation about the arm axis (A). A tool support member (30) has a tool axis (B) and is rotatably supported by the housing (22) for rotation about a transverse axis (C) which is disposed at an acute angle relative to the arm axis (A) for movement between a straight ahead position in which the tool axis (B) is generally parallel to the arm axis (A) and a transverse position in which the tool axis (B) is transverse to the arm axis (A). A spray head (38, 38') is rotatably supported by the tool support member (30) for rotation about the tool axis (B) and the spray head (38, 38') and includes a needle valve (44) movable between open and closed positions for controlling flow. The assembly is characterized by a motion transmitting core element (46) extending from the base (18) for rectilinear movement for moving the needle valve (44) with the core element (46) being flexible for bending through a curved path between the base (18) and the spray head (38, 38') as the housing (22) and/or the tool support member (30) are rotated relative to the base (18) and as the spray head (38, 38') rotates. In addition, the core element (46) is connected to a piston (56) supported by a fluid coupling member (54). The fluid coupling member (54) presents a fluid inlet (60) for actuating the piston (56), a paint connection (68) for receiving paint and an air inlet (76) for receiving spraying air and a bracket (86) supports the coupling member (54) on the robot arm (16) in spaced relationship to the base (18).

19 Claims, 4 Drawing Sheets

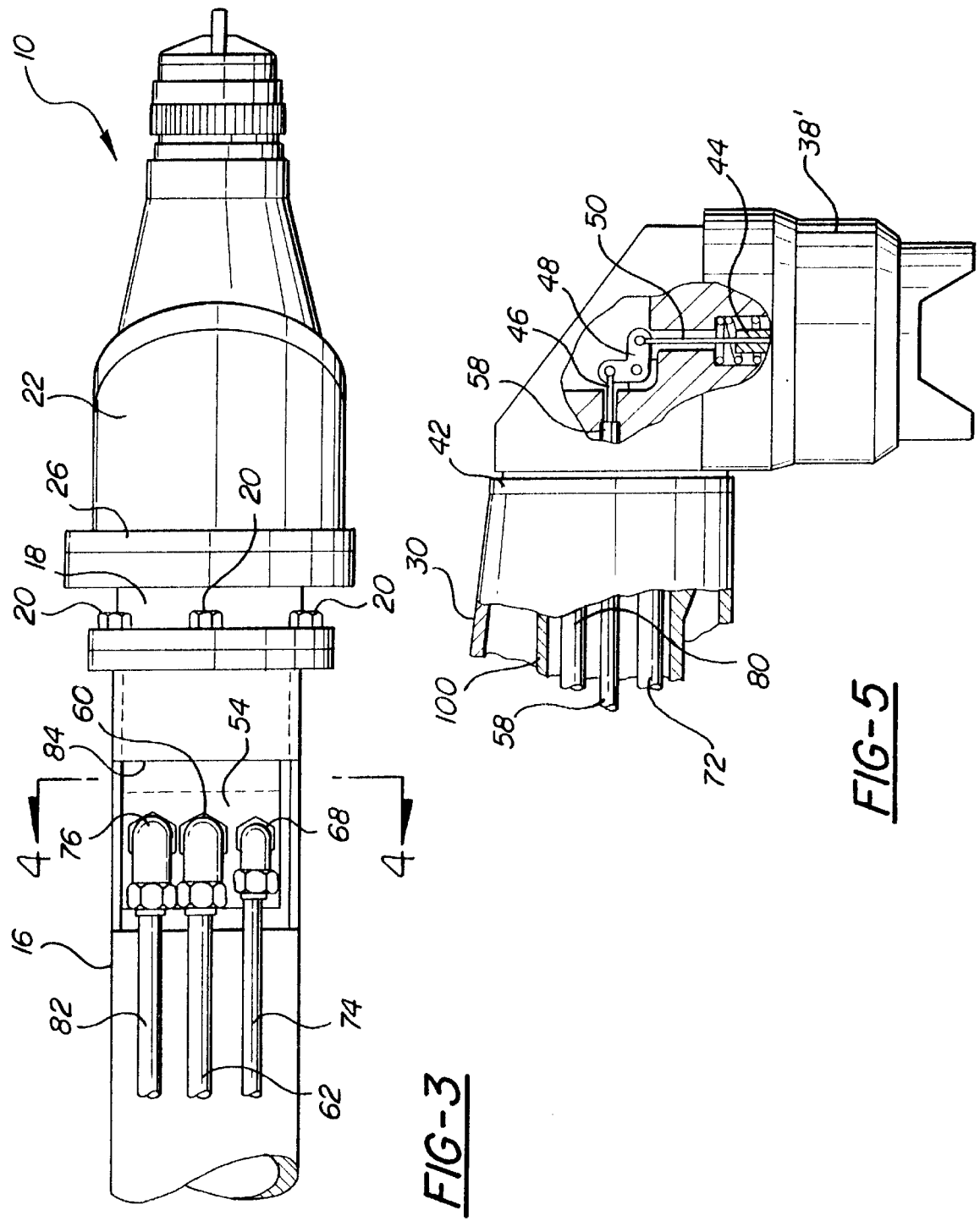

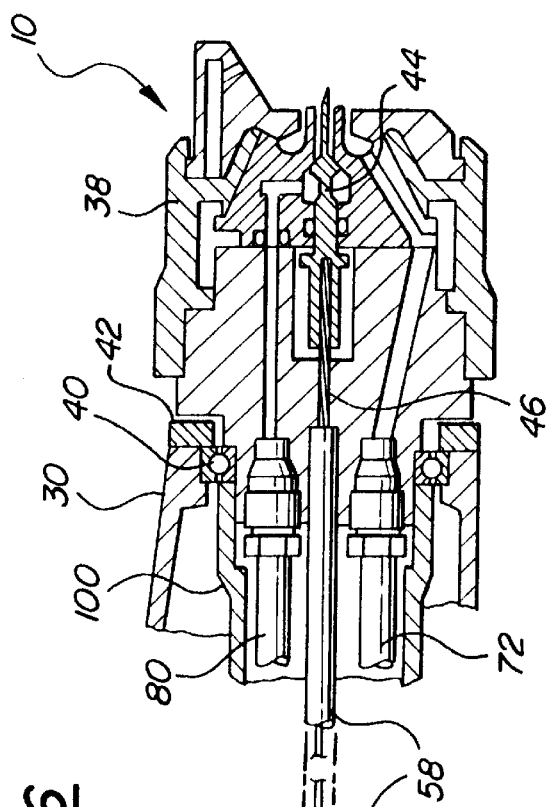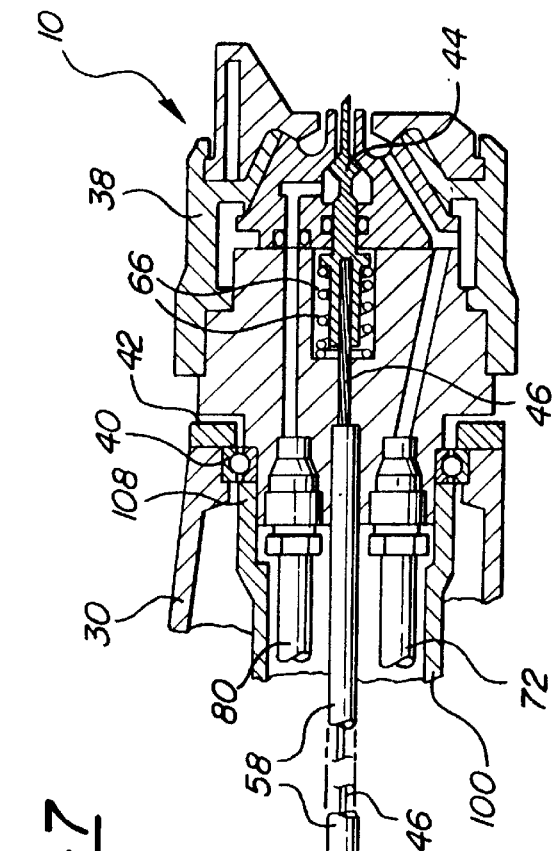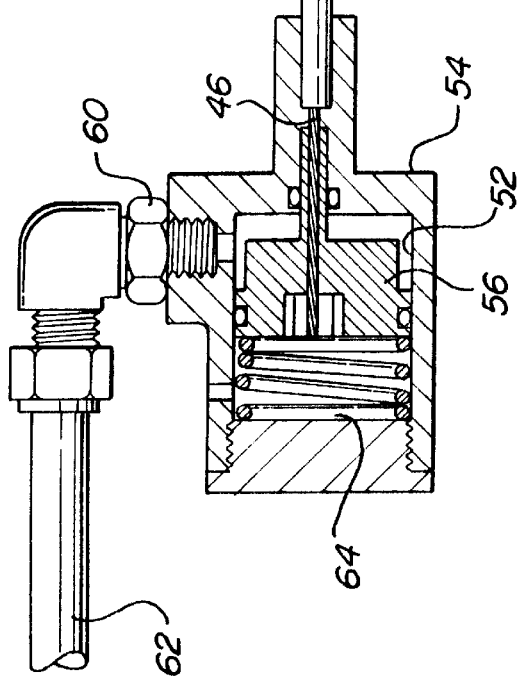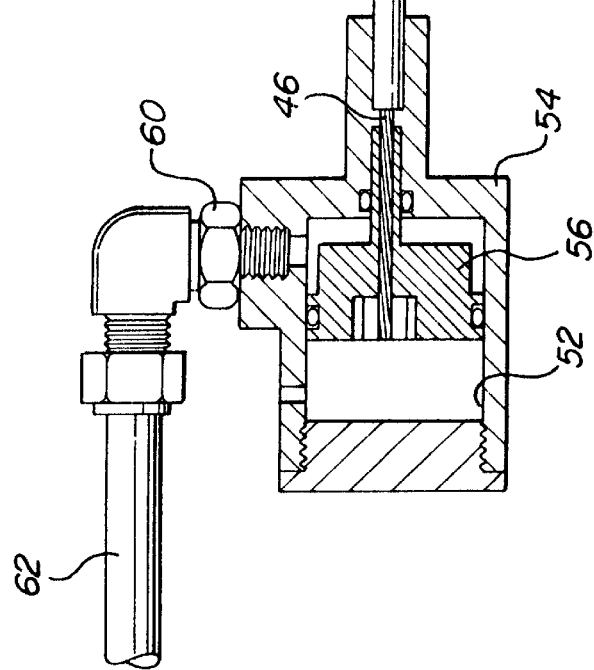
FIG-6
FIG-7

ROBOT WRIST AND SPRAY APPLICATOR

BACKGROUND OF THE INVENTION

1. Field of the Invention

The subject invention relates to a robot wrist and spray head applicator assembly.

2. Description of the Prior Art

Wrist assemblies are well known for supporting various tools including paint spray heads. One such wrist assembly is shown in U.S. Pat. No. 4,690,012 to Dahlquist et al and 4,402,234 to Malarz et al. When spray heads are supported by such wrists, flexible fluid lines extend through the wrist to the spray head to convey paint and spraying air. The paint spray heads typically include a needle valve for controlling the flow of paint through the spray head, e.g., U.S. Pat. 4,613,082 to Gimple et al.

There is a constant objective to minimize the weight of the robot wrist and spray head applicator assembly to reduce the loads upon the various components. The smaller the operating loads, the smaller the size of the components. In addition, it is desirable to reduce the complexity of the assembly of the components.

SUMMARY OF THE INVENTION AND ADVANTAGES

A robot wrist and spray head applicator assembly comprising a base presenting an arm axis and adapted for attachment to a robot arm. A housing is supported by the base for rotation about the arm axis. A tool support member defines a tool axis and is rotatably supported by the housing for rotation about a transverse axis which is disposed at an acute angle relative to the arm axis for movement between a straight ahead position in which the tool axis is generally parallel to the arm axis and a transverse position in which the tool axis is transverse to the arm axis. A spray head is rotatably supported by the tool support member for rotation about the tool axis and the spray head includes a needle valve movable between open and closed positions for controlling flow. A motion transmitting core element extends from the base for rectilinear movement for moving the needle valve, the core element being flexible for bending through a curved path between the base and the spray head as the housing and/or the tool support member are rotated relative to the base.

Accordingly, a robot wrist and spray head applicator assembly constructed in accordance with the subject invention minimizes the size of the various components to minimize the operating loads. In addition, the single coupling member for all of the feed lines and supported by a single bracket significantly reduces the complexity of the assembly of the components.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is an elevational view of a robot assembly incorporating the subject assembly;

FIG. 2 is an enlarged fragmentary cross sectional view of a preferred embodiment of the subject invention;

FIG. 3 is a top view of FIG. 2;

FIG. 4 is a cross sectional view taken along line 4—4 of FIG. 3;

FIG. 5 is a side view, partially broken away and in cross section, of an alternative embodiment;

FIG. 6 is a fragmentary view in cross section of a first version of the embodiment shown in FIG. 2 with the core element biasing spring disposed at the actuator end; and FIG. 7 is a fragmentary view in cross section of a second version of the embodiment shown in FIG. 2 with the core element biasing spring disposed at the needle valve end.

DETAILED DESCRIPTION OF THE PREFERRED EMBODIMENT

Referring to the Figures, wherein like numerals indicate like or corresponding parts throughout the several views, a robot wrist and spray head applicator assembly is generally shown at 10. The assembly is supported from a platform 12 by the robot arms 14 and 16 which are articulated in a manner well known in the art.

The wrist assembly includes a base 18 presenting an arm axis and is adapted for attachment to the distal end of robot arm 16. The distal end of the arm 16 and the base 18 present sandwiched flanges through which bolts 20 extend to threadedly engage the flange on the distal end of the arm 16 to mount the base 18 to the arm 16.

The wrist assembly 10 further includes a housing 22 supported by the base 18 for rotation about the arm axis (A). A bearing 24 is retained to the base 18 by an annular ring 26 bolted to the base 18 and rotatably supports the housing 22 and a first drive gear 28 for rotation about the arm axis (A) which is disposed on the center line of the bearing 24. A first drive gear 28 is fixed to the housing 22 to rotate the housing 22.

A tool support member 30 has a tool axis (B) and is rotatably supported by the housing 22 for rotation about a transverse axis (C) which is disposed at an acute angle relative to the arm axis (A) for movement between a straight ahead position in which the tool axis (B) is generally parallel to the arm axis (A), as shown in solid lines in FIG. 2, and a transverse position in which the tool axis (B) is transverse to the arm axis (A), as shown in phantom in FIG. 2. The tool support member 30 is secured to a second drive gear 36 and both of tool support member 30 and the second drive gear 36 are rotatably supported by a bearing 32, which is retained to the housing 22 by an annular retainer ring 34.

A spray head 38 or 38' is rotatably supported by the tool support member 30 for rotation about the tool axis (B). The spray head 38 includes a nozzle disposed to project a spray fluid, such as paint to be atomized, generally along the tool axis (B) whereas the spray head 38' includes a nozzle disposed to project paint generally transversely to the tool axis (B), e.g., at a right angle to the tool axis (B). The spray head 38 is rotatably supported on the tool support member 30 through a bearing 40 which is retained by an annular ring 42. The spray head 38 includes a needle valve 44 which is movable between open and closed positions for controlling flow to and through the spray head 38 or 38'. The needle valve 44 is disposed parallel to the tool axis (B) in the spray head 38 and transversely to the tool axis (B) in the spray head 38'. As is customary in the art, seals are provided at each of the rotating joints adjacent the bearings.

A motion transmitting core element 46 extends from the base 18 for rectilinear movement for moving the needle valve 44. The core element 46 is flexible for bending through a curved path between the base 18 and the spray head 38 or 38' as the wrist is rotated relative to the base 18. The spray head 38' includes a crank 48 having transverse arms with one of the arms attached to the core element 46 and the other of the arms attached to the needle valve 44 through a shaft or rod 50.

An actuator is disposed adjacent the base 18 for moving the core element 46 rectilinearly in response to fluid pressure. More specifically, the actuator is actuated by fluid pressure and comprises a chamber 52 defined by a coupling member 54 and a piston 56 slidably disposed in the chamber 52. The flexible core element 46 is connected to the piston 56 at one end adjacent the base 18 and to either the needle valve 44 directly in the case of the straight spray head 38 or to the crank 44 in the case of the right angle spray head 38'. A flexible conduit 58 movably supports the core element 46 and extends from the coupling member 54 to the spray head 38 or 38'. In the alternative, the actuator may be electrically energized and comprise a motor, such as a solenoid. Furthermore, the actuator may be disposed remotely in the arms 14 or 16, such near or in the base 12.

The fluid coupling member 54 has a fluid inlet or connector 60 for receiving fluid pressure from a line 62 to actuate the piston 56 of the actuator. In the version of FIG. 6, the fluid, preferably pneumatic, pressure acts upon the piston 56 from the right to move the piston 56 to the left against the biasing action of the spring 64, which is disposed in the chamber 52 of the actuator in the coupling member 54. However, in the version of FIG. 7, the fluid, preferably pneumatic, pressure acts upon the piston 56 from the right to move the piston 56 to the left against the biasing action of the spring 66, which is disposed in the needle valve chamber to act upon the needle valve 44.

The fluid coupling member 54 also includes a paint connection 68 for receiving paint and a paint outlet 70 for delivering paint, and a paint line 72 interconnects the paint outlet 70 and the spray head 38 or 38' for conveying paint from the paint outlet 70 to the spray head 38 or 38'. Paint is conveyed to the paint connection 68 via a paint line 74. A connector or fitting also connects one end of the conduit 58 to the coupling member 54 as the flexible core element 46 extends from the coupling member 54 to the spray head.

The fluid coupling member 54 includes an air inlet connection 76 for receiving air and a air outlet 78 for delivering air, and an air line 80 interconnecting the air outlet 78 and the spray head 38 or 38' for conveying air from the air outlet 78 to the spray head 38 or 38'. Air is delivered to the air inlet connection 76 via an air line 82.

As will be appreciated, the fluid inlet 60, the paint inlet 68 and the air inlet 76 are juxtaposed to one another. In other words, they are disposed right next to one another at the coupling member 54. The robot arm 16 is hollow at its distal end and presents at least one connection opening 84 therein which is spaced from the distal end of the arm 16. The base 18 is supported on the distal end of the robot arm 16 and the coupling member 54 is positioned by a bracket 86 to present the inlets 60, 68 and 76 in the connection opening 84. The bracket 86 supports the coupling member 54 with the base 18 within the robot arm 16 and spaced from the base 18 in the opposite direction from the housing 22 and from the support member 30. The bracket 86 is integral with the base 18 as it extends along the arm axis to space the coupling member 54 from the base 18, however, the bracket could be a separate element bolted to the arm 16 along with the base 18. In fact, the base 18 could be an integral part of the robot arm 16.

A housing drive means for rotating the housing 22 about the arm axis (A) includes not only the first drive gear 28 but also a first flexible drive shaft assembly 88 and first pinion 90 in driving engagement with the first drive gear 28. Similarly, a support member drive means for rotating the support member 30 relative to the housing 22 includes not only the second drive gear 36 but also includes a bevel gear 92 connected to a third drive gear 94 which is driven by a second flexible drive shaft assembly 96 and second pinion 98.

A flexible tubular shaft 100 has an inner end rotatably supported by the housing 22 through bearing 102, bevel gear 92 and bearing 106, which inner end is secured in non-rotating relationship with a center gear 104. The flexible tubular shaft 100 has an outer end 108 in driving engagement with the spray head 38. A spray head drive means includes flexible drive shaft assembly 110 and a third pinion 112 in meshing engagement with the hollow center gear 104 for rotating the inner end of the tubular flexible shaft 100. The flexible and hollow shaft 100 is hollow and the paint line 72, the air line 80 and the core element 46 and the conduit 58 extend from the coupling member 54 and into the hollow shaft 100 at the inner end and through the hollow shaft 100 to the spray head 38 or 38'.

Figure 2:
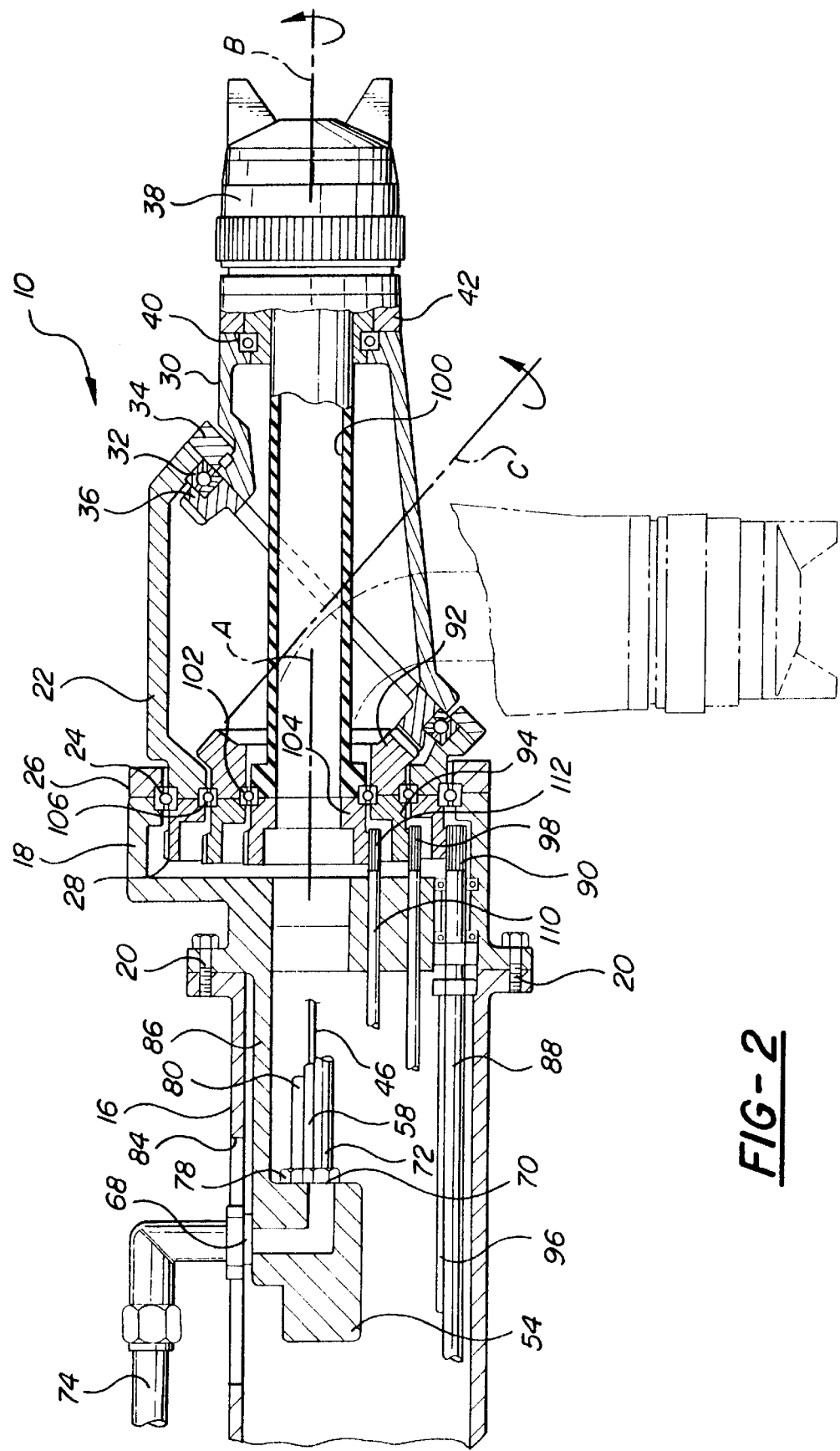

In operation, the drive shaft assembly 96 rotates the second pinion 98 to rotate the third drive gear 94 and bevel gear 92 to rotate the second drive gear 36 to move the tool support member 30 about the transverse axis (C) to anyone of various positions between the straight ahead position and the right angle position. In order to rotate the spray head in a circle when in the right angle position shown in phantom in FIG. 2, or any other transverse angle, the flexible shaft assembly 88 rotates the pinion 90 which, in turn, rotates the first drive gear 28 to rotate the housing 22. In these various positions, the flexible drive shaft assembly 110 rotates the pinion 112 to rotate the center gear 104 and the hollow shaft 100. During all of these movements, the conduit 58 and the lines 72 and 80 wind up upon one another; of course, the unit rotates no more than one complete revolution. Preferably, the unit rotates no more than plus or minus two turns.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A robot wrist and spray head applicator assembly (10) comprising:

a base (18) presenting an arm axis (A) and adapted for attachment to a robot arm (16);

a housing (22) supported by said base (18) for rotation about said arm axis (A);

tool support member (30) having a tool axis (B) and rotatably supported by said housing (22) for rotation about a transverse axis (C) which is disposed at an acute angle relative to said arm axis (A) for movement between a straight ahead position in which said tool axis (B) is generally parallel to said arm axis (A) and a transverse position in which said tool axis (B) is transverse to said arm axis (A);

a spray head (38, 38') rotatably supported by said tool support member (30) for rotation about said tool axis (B);

said spray head (38, 38') including a needle valve (44) movable between open and closed positions for controlling flow of a spray fluid; and a motion transmitting core element (46) extending from said base (18) for rectilinear movement for moving said needle valve (44), said core element (46) being flexible for bending through a curved path between said base (18) and said spray head (38, 38') as said the housing (22) and/or the tool support member (30) are rotated relative to said base (18).

2. An assembly as set forth in claim 1 including an actuator for moving said core element (46) rectilinearly.

3. An assembly as set forth in claim 2 including a flexible conduit (58) movably supporting said core element (46) and extending from said actuator toward said spray head (38, 38').

4. An assembly as set forth in claim 3 including a housing drive means (28, 88, 90) for rotating said housing (22) about said arm axis (A), a support member drive means (36, 92, 94, 96, 98) for rotating said tool support member (30) relative to said housing (22), a flexible shaft (100) having an inner end rotatably supported by said housing (22) and an outer end (108) in driving engagement with said spray head (38, 38'), and spray head drive means (104, 110, 112) for rotating said inner end of said flexible shaft (100).

5. An assembly as set forth in claim 4 wherein said flexible shaft (100) is hollow and said spray fluid line (72) and said core element (46) and said conduit (58) extend into said flexible shaft (100) at said inner end and through said hollow flexible shaft (100) to said spray head (38, 38').

6. An assembly as set forth in claim 5 wherein said actuator (52, 56) is fluid actuated and disposed adjacent said base (18) for moving said core element (46) rectilinearly in response to fluid pressure and including a fluid coupling member (54) defining said actuator (52, 56) and having a fluid inlet (60) for receiving fluid pressure to actuate said actuator (52, 56) and a spray fluid connection (68) for receiving spray fluid and a spray fluid outlet (70) for delivering spray fluid, and a spray fluid line (72) interconnecting said spray fluid outlet (70) and said spray head (38, 38') for conveying spray fluid from said spray fluid outlet (70) to said spray head (38, 38'), said flexible core element (46) extending from said coupling member (54), and wherein said flexible conduit (58) extends from said coupling member (54) and said spray fluid line (72) and said core element (46) and said conduit (58) extend from said coupling member (54) and into said flexible shaft (100) at said inner end.

7. An assembly as set forth in claim 6 wherein said fluid coupling member (54) includes an air inlet connection (76) for receiving air and an air outlet (78) for delivering air, and an air line (80) interconnecting said air outlet (78) and said spray head (38, 38') for conveying air from said air outlet (78) to said spray head (38, 38').

8. An assembly as set forth in claim 7 wherein said fluid inlet (60), said spray fluid inlet (68) and said air inlet (76) are juxtaposed to one another.

9. An assembly as set forth in claim 8 wherein said air outlet (78), said spray fluid outlet (70) and said core element (46) are juxtaposed to one another at said coupling member (54).

10. An assembly as set forth in claim 9 including a bracket (86) for supporting said coupling member (54) with said base (18) on a robot arm.

11. An assembly as set forth in claim 9 including a bracket (86) for supporting said coupling member (54) with said base (18) within a robot arm (16) and spaced from said base (18) in the opposite direction from said housing (22) and from said support member (30).

12. An assembly as set forth in claim 10 wherein said bracket (86) is integral with said base (18) and extends along said arm axis (A) to space said coupling member (54) from said base (18).

13. An assembly as set forth in claim 11 including a hollow robot arm (16) having a distal end presenting at least one connection opening (84) therein spaced from said distal end, said base (18) being supported on said distal end of said robot arm (16), said coupling member (54) being positioned by said bracket (86) to present said inlets (60, 68, 76) in said connection opening (84).

14. An assembly as set forth in claim 11 wherein said actuator (52, 56) includes a chamber (52) defined by said coupling member (54) and a piston (56) slidably disposed in said chamber (52), said flexible core element (46) being connected to said piston (56).

15. An assembly as set forth in claim 14 wherein said spray head (38) includes a nozzle disposed to project spray fluid generally along said tool axis (B).

16. An assembly as set forth in claim 15 wherein said spray head (38') includes a nozzle disposed to project spray fluid generally transversely to said tool axis (B), said needle valve (44) being disposed transversely to said tool axis (B), and including a crank (48) having transverse arms with one of said arms attached to said core element (46) and the other of said arms attached to said needle valve (44).

17. A robot wrist and spray head applicator assembly comprising:

a base (18) presenting an arm axis (A) and adapted for attachment to a robot arm;

a housing (22) supported by said base (18) for rotation about said arm axis (A);

tool support member (30) having a tool axis (B) and rotatably supported by said housing (22) for rotation about a transverse axis (C) which is disposed at an acute angle relative to said arm axis (A) for movement between a straight ahead position in which said tool axis (B) is generally parallel to said arm axis (A) and a transverse position in which said tool axis (B) is transverse to said arm axis (A);

a spray head (38, 38') rotatably supported by said tool support member (30) for rotation about said tool axis (B); and a fluid coupling member (54) having a paint connection (68) for receiving spray fluid and a spray fluid outlet (70) for delivering spray fluid and an air inlet connection (76) for receiving air and an air outlet (78) for delivering air, a spray fluid line (72) interconnecting said spray fluid outlet (70) and said spray head (38, 38') for conveying spray fluid from said spray fluid outlet (70) to said spray head (38, 38'), and an air line (80) interconnecting said air outlet (78) and said spray head (38, 38') for conveying air from said air outlet (78) to said spray head (38, 38'), said lines (72, 80) being flexible for bending through a curved path between said base (18) and said spray head (38, 38') as said housing (22) and said tool support member (30) are respectively rotated relative to said base (18), said air outlet (78) and said spray fluid outlet (70) being juxtaposed to one another at said coupling member (54); and a bracket (86) for supporting said coupling member (54) on a robot arm in spaced relationship to said base (18).

18. An assembly as set forth in claim 17 wherein said bracket (86) is integral with said base (18) and extends along said arm axis (A) to space said coupling member (54) from said base (18).

19. An assembly as set forth in claim 18 including a hollow robot arm (16) having a distal end presenting at least one connection opening (84) therein spaced from said distal end, said base (18) being supported on said distal end of said robot arm (16), said coupling member (54) being positioned by said bracket (86) to present said inlets (68, 76) in said connection opening (84).

\* \* \* \* \*